US007614329B2

(12) United States Patent
Aigner

(10) Patent No.: US 7,614,329 B2
(45) Date of Patent: Nov. 10, 2009

(54) STOP RULE FOR CIRCULAR SAW BENCHES

(76) Inventor: Georg Aigner, Thannenmais 2, Reisbach (DE) 94419

( * ) Notice: Subject to any disclaimer, the term of this patent is extended or adjusted under 35 U.S.C. 154(b) by 410 days.

(21) Appl. No.: 11/571,567

(22) PCT Filed: Apr. 11, 2006

(86) PCT No.: PCT/EP2006/061515

§ 371 (c)(1),
(2), (4) Date: Feb. 6, 2007

(87) PCT Pub. No.: WO2006/125695

PCT Pub. Date: Nov. 30, 2006

(65) Prior Publication Data

US 2008/0092707 A1 Apr. 24, 2008

(30) Foreign Application Priority Data

May 25, 2005 (DE) ....................... 10 2005 024 111

(51) Int. Cl.
*B23D 45/06* (2006.01)

(52) U.S. Cl. ........................ 83/437.2; 83/446; 83/477.2

(58) Field of Classification Search .................. 83/438, 83/446, 477.2, 437.2–437.7
See application file for complete search history.

(56) References Cited

U.S. PATENT DOCUMENTS 3,901,109 A * 8/1975 Mullinax, Sr. .............. 409/169
4,600,184 A 7/1986 Ashworth et al.
6,360,642 B1 3/2002 Miller et al.
6,578,461 B1 6/2003 Loo

FOREIGN PATENT DOCUMENTS

DE 19515829 11/1996
DE 202005010656 11/2005

OTHER PUBLICATIONS

European Patent Office, Decision over the Grant of a European Patent according to Article 97(1) EPU, Jul. 31, 2008.
European Patent Office, Allowed Claims in Patent 1851017.

* cited by examiner

*Primary Examiner*—Kenneth E. Peterson
(74) *Attorney, Agent, or Firm*—Themis Law

(57) ABSTRACT

A fence ruler for table circular saws includes a longitudinally extending profiled hollow body of mostly rectangular cross-section mountable onto a machine table. One side of the profiled hollow body is formed as a guiding leg with a protruding extension having on its front edge a guiding ruler for guiding lower work pieces. The guiding leg may also be positioned on the machine table to extend at a right angle from the same. A slide is positioned within the hollow space in the hollow body and is movable longitudinally from the outside. At least one catch protrudes from the hollow body and is guided through a longitudinal slot in the profiled hollow body that opens to the outside through an opening slot in the guiding ruler.

30 Claims, 5 Drawing Sheets

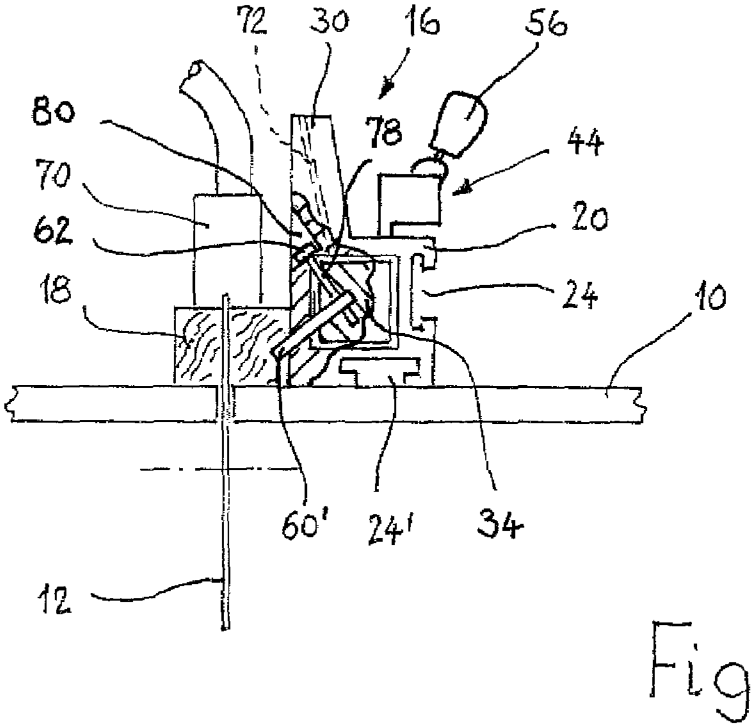
Fig. 3
Fig. 4
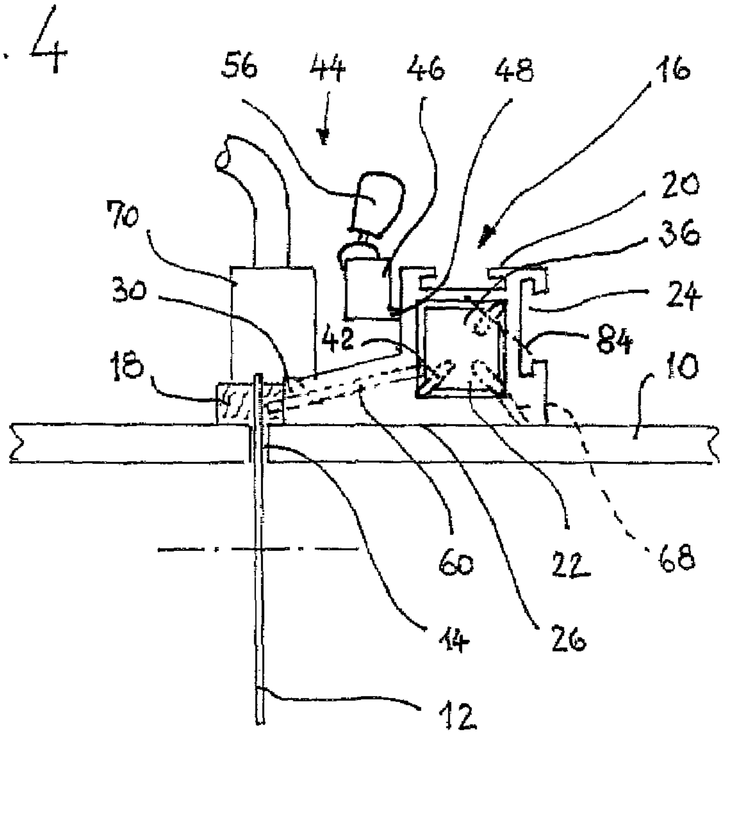

STOP RULE FOR CIRCULAR SAW BENCHES

BACKGROUND OF THE INVENTION

1. Field of The Invention

The present invention relates to a fence ruler for table circular saws that includes a longitudinally extending profiled hollow body of a mostly rectangular cross section. Means are formed on the profiled hollow body for the mounting onto a machine table, and one side of the profiled hollow body is formed as a guiding leg with a protruding extension having, on its front edge, a fence ruler for low work pieces. When the profiled hollow body lies horizontally on the machine table, the guiding leg protrudes upwards from the machine table in essentially perpendicular direction.

2. Description of Related Art

Fence rulers are used in table circular saws as guides for work pieces having sufficient width, for example, boards or planks, which are pushed forward manually. For smaller ledges, auxiliary means are used for as advancing the work pieces, such as the push-sticks designed by Aigner Sicherheitstechnik. Due to the fact that the saw blade must be covered upwards by an extractor hood, the space between hood and fence ruler may be too small to utilize a push-stick for advancing the work piece in the case of very narrow ledges.

The French Institut National de Recherche et de Sécurité (INRS) has developed a fence ruler with an integrated advancing element, which is actuated by the carpenter from the outside with a handle, in order to push forward the work piece to be cut. This fence ruler, however, is very bulky and heavy, and can only be used in a standing position, the considerable disadvantage of which is that, when cutting narrow or lower ledges, a protective and extractor hood cannot be mounted above the saw blade due to insufficient space. At the most, the extractor hood would have to be mounted above the guiding leg of the fence ruler, which would result in insufficient coverage of the saw blade and inadequate dust extraction.

SUMMARY OF THE INVENTION

The present invention concerns a fence ruler for table circular saws, which, by utilizing commercially available profiled hollow bodies with only minimal modifications, is suitable for application in two positions disposed 90° apart—one upright and the other horizontal so that even narrow and low work pieces can be processed when utilizing a protective hood.

In one embodiment of the invention, a profiled hollow body includes a hollow space, in which a slide is positioned that is slidable in a longitudinal direction and that includes at least one catch extending therefrom, which is guided through a longitudinal slot in the profiled hollow body positioned in the guiding ruler.

A fence ruler constructed in accordance with the principles of the present invention is considerably smaller than the above mentioned French fence ruler and can be positioned on the table of a circular saw in vertical as well as in horizontal position, where it will be available for the advancement of the work piece a without any further arrangements.

In a horizontal position, the work piece advancement occurs via the integrated catch, so that the protective hood can be optimally lowered, without consideration of space-requiring means for the advancement, which now becomes redundant.

In one embodiment of the invention, two catches with an offset angle of approximately 90° extend from the slide, wherein the first catch engages through a first longitudinal slot integrated into the guiding leg near the lower edge of the guiding leg and opposite to the guiding ruler, whereas the second catch is guided through the above mentioned second longitudinal slot in the profiled hollow body, which opens in the guiding ruler.

With this arrangement, a work piece can be advanced with the use the additional catch also in the vertical position of the fence ruler.

The catch or catches respectively are automatically put into work position by positioning them in a swivel-movable arrangement on the slide so that, while the catch or catches shift in the respective longitudinal slot during the advancement of the work piece, they are swiveled outward by friction. The catch that is not utilized remains in its longitudinal slot and is therefore inactive.

In one aspect of the invention, a slider is mounted to the slide and is guided outwards through an additional through slot parallel to the longitudinal slot in the profiled hollow body and bears a handle. Such handle can be set in several angle positions on the slider, in order to achieve the most favorable work position.

In another aspect of the invention, the slide is formed in two parts and exhibits a cuboid bearing body, on which the catches are mounted, and which is connected through a rod to a cuboid thrust body, on which the slider is mounted. This two-part formation of the slide to include the bearing body and the thrust body is of considerable advantage, because no jams within the hollow space of the profiled hollow body are to be expected along the length of the slide. To enhance this construction, the thrust body can be positioned in the hollow body with the use of freely pivotable supporting rollers.

In still another aspect of the invention, the slider consists of an externally mounted block bearing a handle, and of a flange protruding from the block, which extends into the hollow space through the through slot to be mounted onto the thrust body. This formation of the slider permits a simple engagement of the flange with the thrust body located in the hollow space via, e.g., a screw pushable through a bore hole in the profiled hollow body, by which the flange can be affixed to the thrust body.

In yet another aspect of the invention, the profiled hollow body is mounted onto the machine table c with two longitudinal slots having T-shaped profiles, which are each incorporated into the side of the profiled hollow body that is opposite to a longitudinal slot corresponding to one of the two catches and which engage a clamping body.

In certain situations, it is not possible to attach the profiled hollow body directly to a clamping body provided on the machine table, because the respective dimensions may not match up Accordingly, an adapter with a clamping strip is provided, in which the rear wall of the adapter shows an adjustable receptacle slot for engaging a clamping body, and which is horizontally adjustable within a clamping enclosure mounted to the machine table.

In order to affix the fence ruler to the clamping enclosure, a clamping connection body can be engaged with the adapter and mounted on the same. The clamping connection consists of a vertical plate to be inserted between the clamping enclosure and the profiled hollow body, from which plate a top wall and two sidewalls extend horizontally, and which will be fit to the profiled hollow body and the clamping enclosure when the clamping body is in the clamped position.

BRIEF DESCRIPTION OF THE SEVERAL VIEWS OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 3 illustrates a schematic, partially sectioned front view of the vertically mounted fence ruler when cutting a larger work piece, utilizing a protective and extractor hood;

FIG. 4 illustrates the schematic front view of the fence ruler in horizontal position when cutting a low, ledge-shaped work piece, utilizing a protective and extractor hood;

DETAILED DESCRIPTION OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
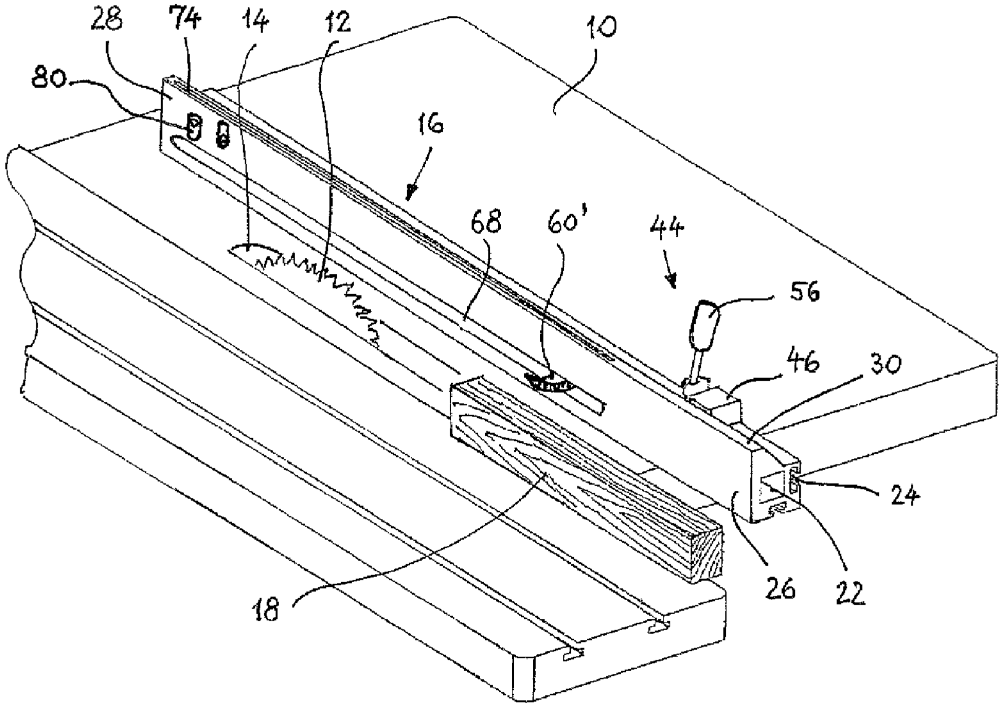
FIG. 1 illustrates a fencing ruler on a table circular saw in vertical position.

FIG. 1 shows a table circular saw with machine table 10 and saw blade 12, which protrudes upwards through opening 14 from machine table 10. On machine table 10, fence ruler 16 is mounted in a known manner, serving as a guide for ledge-shaped work piece 18.

FIGS. 1 through 4 show that fence ruler 16 consists of profiled hollow body 20, which extends in longitudinal direction and which shows a mostly rectangular or quadriform cross section with hollow space 22, also having a rectangular or quadriform cross section, as chosen by a user. On profiled hollow body 20, there are profile grooves 24 and 24', which are used with other mounting means not illustrated here.

One side of the profiled hollow body 20 is formed as guiding leg 26 with coplanar extruding extension 28 which includes, on its front edge, fence ruler 30 for low work pieces 16 (compare FIG. 4). In the horizontal position of fence ruler 16 shown in FIGS. 2 and 4, guiding leg 26 is positioned on the machine table 10 in such a manner that fence ruler 30 is extruding upwards perpendicularly from machine table 10.

Figures 5, 6:
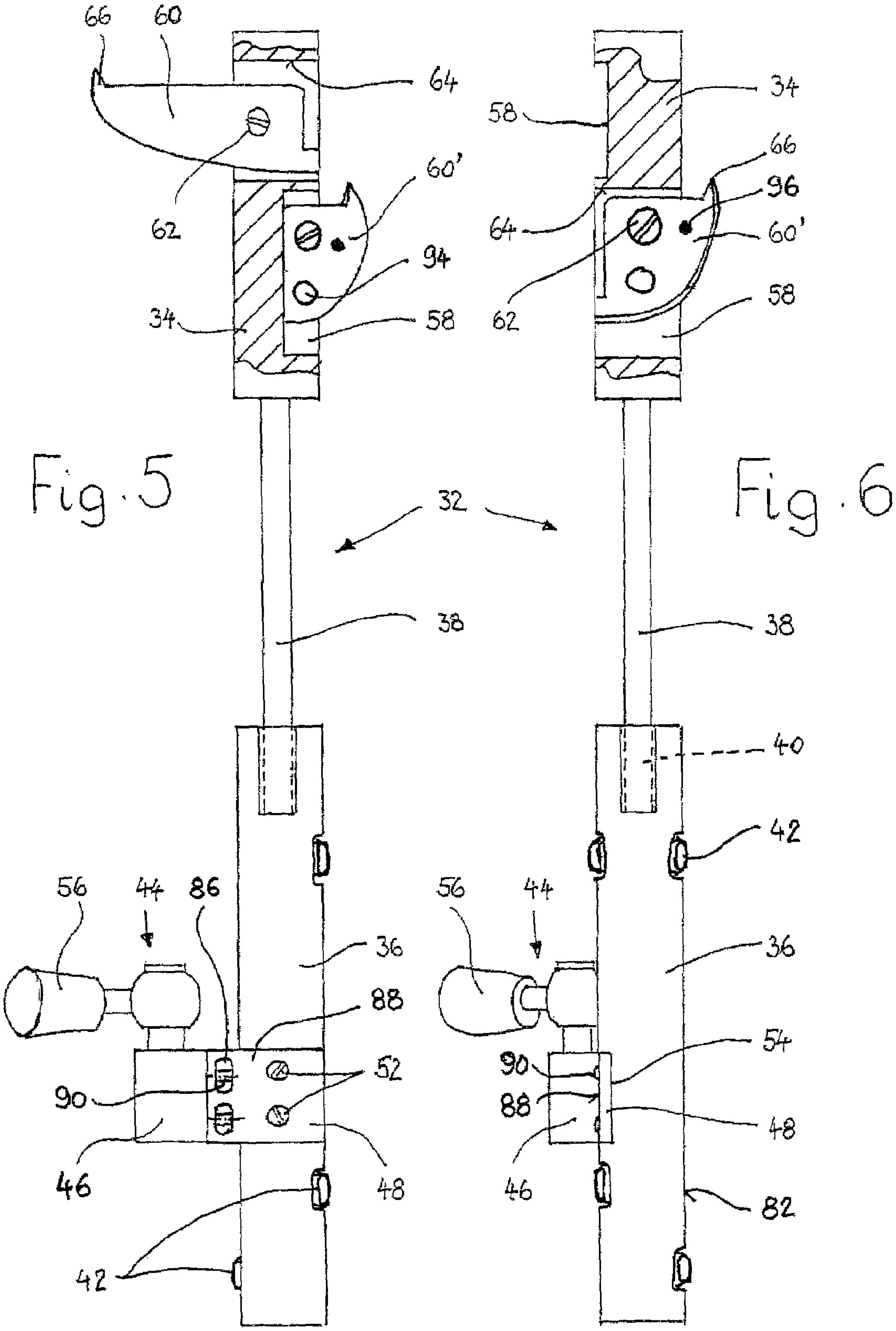
FIG. 5 illustrates, in enlarged top view, the partially opened slide of the fence ruler.
FIG. 6 is a top view of the slide in FIG. 5, turned by 90°.

In hollow space 22 of profiled hollow body 20, a slide 32 is positioned as shown in FIGS. 5 and 6, and can be adjusted longitudinally from outside in a yet to be described manner. Slide 32 is formed in two parts and has cuboid bearing body 34 as well as cuboid thrust body 36, both of which can be manufactured from plastics and are connected to each other the via rod 38. Rod 38 is screwed with one threaded end 40 into a corresponding thread bore hole in thrust body 36.

In the present embodiment, bearing body 34 as well as thrust body 36 have a square cross-section corresponding to the cross-section of hollow space 22. For a smooth-running adjustment of thrust body 36 and hence of the whole slide 32 in hollow space 22, thrust body 36 is positioned via freely pivoting supporting rollers 42 in hollow body 22. Supporting rollers 42 are positioned, as indicated in FIGS. 4 to 6, to rotate about obliquely arranged pivots 84 situated in corresponding slot-shaped receptacle recesses, in such a manner that they extend over three of the longitudinal edges 82 of the thrust body 36 and also roll off on the interior longitudinal edges of hollow space 22.

In order to adjust slide 32 longitudinally from the outside, slider 44 is included that consists of externally attached block 46 and flange 48 extending from the same, which enters hollow space 22 by means of through slot 50 (see FIG. 2) of profiled hollow body 20, and which is attached via two screws 52 into recess 54 of thrust body 36. The two screws 52 are accessible via a bore hole in profile slot 24 of the profiled hollow body, which is not illustrated further.

Figure 2:
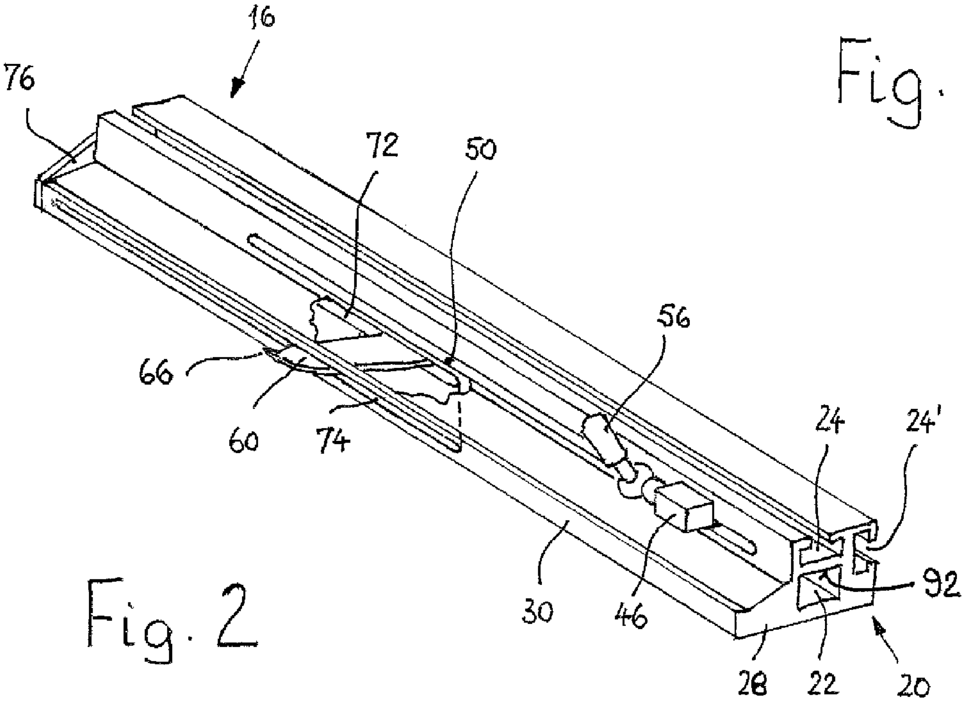
FIG. 2 illustrates the fence ruler shown in FIG. 1, slightly modified, in horizontal position.

FIGS. 5 and 6 show that, in each of two recesses 86 of flange 48, a sliding roller 90 is positioned to extend beyond its surface 88, in order for it to roll off at opposite interior wall 92 of hollow space 22 (see FIG. 2). Because of this arrangement, a further contribution to a smooth adjustment of slide 32 is provided.

Both front sides of profiled hollow body 20 may be covered by cap 76, which bears on its interior side an elastic buffer pad extending into hollow space 22 and which serves as a shock-absorbing element for slide 32.

On block 46, handle 56 is mounted which can be adjusted in known manner to have one of several angle positions, in order for the selection of the ergonomic position for handle 56 that is most favorable.

As FIGS. 3, 5 and 6 also show, slot-shaped receptacle recesses 58 are integrated on two rectangularly adjacent sides of bearing body 34, and each can accept catch 60 and 60', respectively. The two catches 60, 60' are each mounted via eccentrically borne pivot 78 (see FIG. 3) swivable between the angles delimited by stop surfaces 64. The free end of one or both catches 60, 60' is formed as protruding tip 66, which enters the timber to be cut at the beginning of the advance.

FIG. 3 shows that each of the two pivots 78 are formed as screw heads 62 on the end facing the outside, which is inserted obliquely into bearing body 34 and is accessible from the outside. Screw head 62 is supported in opening 80 and can easily be removed when required, if, for example, a damaged catch 60 must be replaced. The two openings 80, which are integrated into guiding leg 28 (see FIG. 1), can be closed using a lid (not shown), which terminates flush with the surface of guiding leg 26.

First catch 60' is formed shorter than second catch 60 (see especially FIG. 5). This first and shorter catch 60' engages longitudinal slot 68, which is integrated close to the lower edge of guiding leg 26 opposite to fence ruler 30 (see FIG. 1). Thus, catch 60' is utilized in the vertical positioning of fence ruler 16, shown in FIGS. 1 and 3, for the advancement of a relatively thick or high work piece 18, over which a protective or extractor hood can be positioned.

Second and longer catch 60 is utilized, according to FIG. 4, in the advancement of low work piece 18 on fence ruler 30, which extends in the horizontal position of fence ruler 16 perpendicularly upwards from machine table 10. Accordingly, second catch 60 is guided through second longitudinal slot 72 in profiled hollow body 20 to extend from its opening slot 74 in guiding ruler 30 (see FIG. 2). Second longitudinal slot 72 is integrated or slotted into extension 28 from the front side of profiled hollow body 20, as illustrated in FIG. 2, and is covered by screwed-on cap 76. Longitudinal slot 72 can also be integrated into extension 28 to end shortly before the face side of the profiled hollow body 20 (see FIG. 2), thereby increasing the stability of extension 28.

Because both catches 60, 60' are borne pivotably on bearing body 34 as described, it is required that they be pivoted outwards by friction when moving into the appropriate longitudinal slot 68 or 72 respectively, for the advancement of the work piece, in order to grip the respective work piece 18.

As already mentioned, short first catch 60' is eccentrically borne via its axis 78, the matching screw head 62 of which can be seen in FIGS. 5 and 6. In addition to this arrangement, a heavier counterweight 94 may be integrated into catch 60' consisting of relatively light plastic. The end result is that, when slide 32 is moved in the opposite direction of the work piece advancement, catch 60' swivels back into its rest position in the appropriate longitudinal slot 68. This is especially advantageous when fence ruler 16 is slipped in horizontal position (see FIG. 2) onto the machine table and inserted into a clamping enclosure mounted there; in this event, catch 60' extruding from longitudinal slot 68 would be an obstacle, because it would abut with the edge of machine table 10.

As also indicated in FIGS. 5 and 6, first catch 60' can be equipped with a brake friction element 96, alternatively or in addition to counterweight 94, that can be manufactured, e.g., from a soft-elastic material inserted into catch 60', and that extends from the top and the bottom surfaces of catch 60', frictionally dragging in longitudinal slot 68 when slide 32 is moved in a direction opposite to the direction of advancement of the work piece, swiveling catch 60' back into its rest position in longitudinal slot 68.

Figure 7:
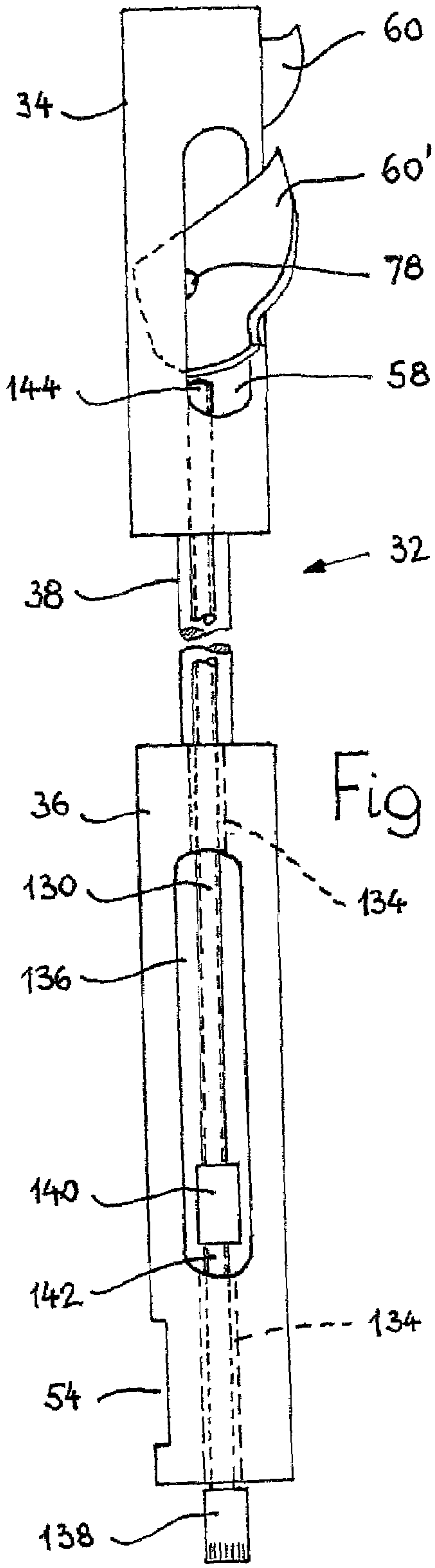
FIG. 7 is a variation of FIG. 6 with the first catch swiveled to rest position.
Figure 8:
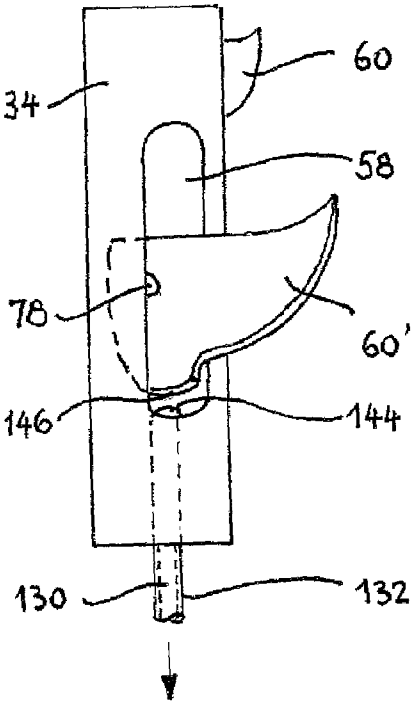
FIG. 8 is the catch shown in FIG. 6 in swiveled out position.
Figure 9:
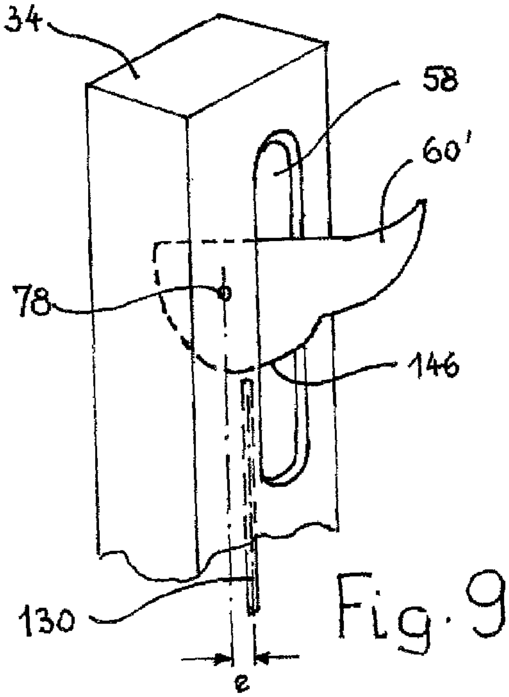
FIG. 9 is a view of FIG. 8, turned to the plane of the catch.

FIGS. 7 to 9 show a variant of FIGS. 4, 5 and 6, suited for swiveling back the shorter first catch 60' to its rest position in the first longitudinal slot. To this end, adjustment rod 130 is used, with external thread 132, which is screwed axially to be adjustable longitudinally in a thread bore hole of bearing body 34. In thrust body 36 of slide 32, adjustment rod 130 is guided outwards by longitudinal bore 134, which is interrupted by a recess in longitudinal direction 136, where it can be turned by a turn actuating element 138 and hence set to axial direction. Adjustment rod 130 is manufactured preferably in a resilient material, for example plastic, so that it can be inserted into thrust body 36 via recess 136, and within this recess 136 can be screwed into screw bushing 140, creating a connection to rigid threaded rod 142. The above mentioned turn actuating element 138 is screwed to the externally protruding end of the threaded rod 142 and is attached, by, e.g., adhesives. A corresponding adhesive connection can also be applied between screw bushing 140 and adjustment rod 130 on the one hand, and threaded rod 142 on the other hand.

Free end 144 of adjustment rod 130, facing first catch 60', engages catch 60' during the back-swiveling of catch 60' to its rest position, as shown in FIG. 7, within seat recess 58 of bearing body 34. For this reason, adjustment rod 130 is axially moved, via turn actuating element 138, opposite to the direction of the arrow shown in FIG. 8, where free end 144 comes to stop at bow-shaped skirt edge 146 of catch 60'. Because, as shown in FIG. 9, the longitudinal axis of adjustment rod 130 has an eccentric distance to swiveling axis 78 of catch 60', catch 60' is swiveled back from its swiveled work position of FIGS. 8 and 9 to its rest position (shown in FIG. 7) into bearing body 34.

In order to restrict the longitudinal setting of adjustment rod 130, screw bushing 140, as well as turn actuating element 138, are used as limit stops, which are stopping at the corresponding opposing planes of thrust body 36. FIG. 7 shows that these opposing planes of thrust body 36 are formed, on the one hand, by recess 136 and, on the other hand, by the free end of thrust body 36. As long as adjustment rod 130 is pushed forward into the axial position shown in FIG. 7, it will retain catch 60' in its swiveled-in rest position. When adjustment rod 130 is retracted in the direction of the arrow in FIG. 8, catch 60' can again swivel outwards from bearing body 34 to its operating position.

In order to return first catch 60' to its swiveled-in rest position and to retain it there, other means instead of adjustment rod 130 may be employed, for example, a pulling device to be actuated from the outside or a similar device.

Figure 10:
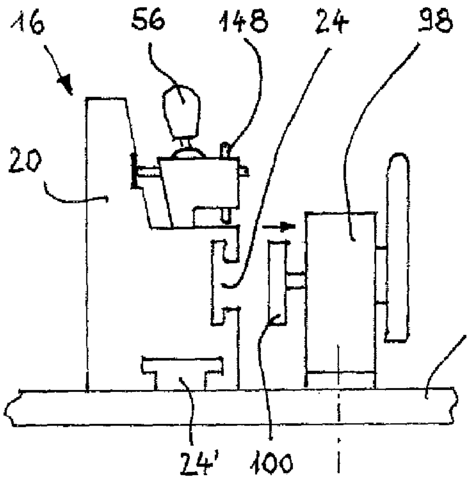
FIG. 10 is a schematic side view of the fence ruler prior to its mounting on a clamping enclosure attached to the machine table.
Figure 11:
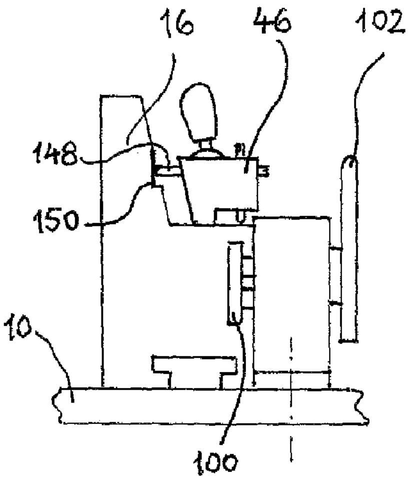
FIG. 11 illustrates the fence ruler clamped to the clamping enclosure.

FIGS. 10 and 11 show, in schematic side view, fence enclosure 16 before and after the attachment of clamping enclosure 98, which is mounted onto machine table 10. On clamping enclosure 98, ledge-shaped clamping body 100 is positioned, which can be adjusted in horizontal direction using lever 102. To fix fence ruler 16 in vertical position—the same procedure also applies for the horizontal position not shown here—fence ruler 16 is pushed with its T-shaped profile slot 24 (or 24', respectively) on ledge-shaped clamping body 100. Consequently, clamping body 100 is retracted via lever 102 in the direction of the arrow shown in FIG. 7, horizontally to the clamping enclosure, affixing fence ruler 16 immovably.

Figure 12:
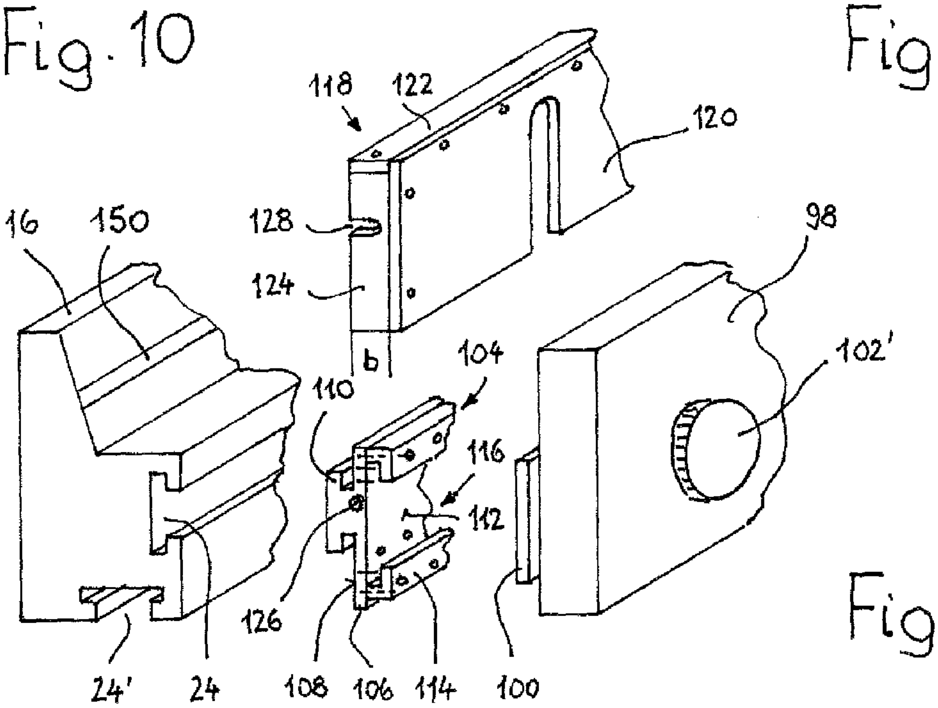
FIG. 12 illustrates, in exploded view, the option of mounting the fence enclosure on a clamping enclosure with differing dimensions of the clamping body, by using an adapter.
Figure 13:
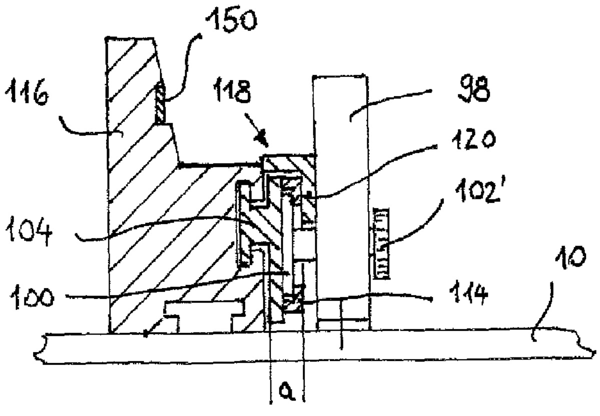
FIG. 13 is a partially sectioned view of the fence enclosure coupled with an adapter, as per FIG. 12.

FIGS. 12 and 13 illustrate the situation where the table circular saw is fitted with clamping enclosure 98, whose clamping body 100 does not conform to the dimensions of T-shaped longitudinal slot 24 or 24' of fence ruler 16. In order to achieve a proper affixing of fence ruler 16 to machine table 10 in such a situation, adapter 104 is employed, consisting of plate 106, from front side 108, from which clamping strip 110 protrudes, having a T-shaped cross-section that corresponds to the T-profile of longitudinal slot 24. On rear side 112 of plate 106, two bars 114 with an L-shaped cross-section are mounted, restricting receptacle slot 116 at the top and bottom. The two bars 114 can be mounted in various heights to rear side 112 of plate 106, which is illustrated with the hole rows for such an adjustment drawn schematically. In such a manner, the width of receptacle slot 116 can be adjusted to match clamping body 100 of clamping enclosure 98, that is mounted onto machine table 10.

FIGS. 12 and 13 show, furthermore, that clamping connection element 118 can also be mounted on adapter 104 and that clamping connection element 118 consists of vertical plate 120, inserted between clamping enclosure 98 and the two bars 114 of adapter 104. One upper wall 122 and two side walls 124 extend horizontally from plate 120, whereby width b of side walls 124 and upper wall 122, shown in FIG. 12, is somewhat larger than the thickness of plate 106 with mounted bars 114, shown in FIG. 14. This provides that, when retracting clamping body 100 using actuating element 102' in the direction of the arrow shown in FIG. 10, the side of fence ruler 16 facing clamping enclosure 98 is pulled tightly against clamping connection element 118, causing fence ruler 16 to be engaged.

In FIG. 12, it is shown that setscrew 126 can be screwed in each of the side face planes of adapter 108, entering recess 128 that is integrated into side wall 124 of clamping connection element 118. In this manner, clamping connection element 118 is engaged stably between fence ruler 116 and clamping enclosure 98.

In FIGS. 10 and 11, it is finally shown that block 46 for the movement of slider 44 may include one or two horizontal and vertical guiding elements, which are supported at their ends by the corresponding wall of profiled hollow body 20. Such guiding elements may consist of setscrews 148, which may be adjusted from the outside. The corresponding wall of profiled hollow body 20 may include wear-resistant insert 150, for example, a spring steel strip. With these guiding elements, a tilt-resistant, smooth movement of slide 32 in hollow space 22 of profiled hollow body 20 is assured, hence the supporting rollers 42 and sliding rollers 90 shown in FIGS. 5 and 6 can be dispensed with.

While the invention has been described in connection with the above described embodiments, it is not intended to limit the scope of the invention to the particular forms set forth, but on the contrary, it is intended to cover such alternatives, modifications, and equivalents as may be included within the scope of the invention.

What is claimed is:

1. A fence ruler for a circular saw table, said fence ruler comprising:

a profiled hollow body extending longitudinally and having an essentially rectangular cross-section, the profiled hollow body being mountable onto the saw table in two different orientations, said body having one side formed as a guiding leg extending from the profiled hollow body, the guiding leg comprising a guiding ruler formed on its outer edge, the guiding ruler being suited for use with a lower work piece and extending to provide a surface essentially perpendicular to the saw table when the guiding leg lays on the saw table, wherein a slide is disposed in the hollow space extending longitudinally within the profiled hollow body, the slide being slidable within the profiled hollow body from the outside of the hollow space, and wherein a first catch and a second catch protrude from the slide, the second catch moving through a second longitudinal slot in the profiled hollow body and protruding to the outside of the profiled hollow body through an opening slot in the guiding ruler for advancing a workpiece when the guiding legs lays on the saw table, the first catch extends from a first longitudinal slot situated near the edge of the guiding leg closer to the saw table and opposite the guiding ruler for advancing a workpiece when the guiding leg is reoriented upwardly from the saw table, the two catches being disposed at an angle of approximately 90° to each other.

2. The fence ruler according to claim 1, wherein at least one of the catches is mounted swivably on a pivot on the slide, causing the at least one of the catches to be swivable outwards by frictional engagement, the at least one of the catches moving in the respective longitudinal slot to promote the advancement of the work piece.

3. The fence ruler according to claim 1 wherein the catches have a hook-shaped tip.

4. The fence ruler according to claim 1, further comprising a slider mounted on the slide, the slider extending outwards through a through slot parallel to the first longitudinal slot in the profiled hollow body, the slider further having a handle.

5. The fence ruler according to claim 4 wherein the handle can be set to several angular positions on the slider.

6. The fence ruler according to claim 4, wherein the slide is formed in two parts and includes a bearing body, on which the catches are mounted, and which is connected with a rod to a thrust body, the slider being attached to the thrust body.

7. The fence ruler according to claim 6, wherein the catches are each positioned in a slot-shaped receptacle recess in the bearing body, the slot-shaped receptacle recess being delimited at one end by a stop plane, each of the catches being swivable about a pivot that engages from the outside bore hole in the bearing body.

8. The fence ruler according to claim 7, wherein the pivot is screwed into the bore hole, and wherein the screw head of the pivot is accessible from the outside through an opening in the guiding leg.

9. The fence ruler according to claim 8, wherein at least one of the catches is positioned eccentrically over its pivot.

10. The fence ruler according to claim 9, wherein the first catch, includes a counter-weight, the counter-weight causing the catch to swivel back into a rest position in the first longitudinal slot when the slide moves in a direction opposite to the direction of advancement of the work piece.

11. The fence ruler according to claim 8, further comprising means for blocking the first catch within the first longitudinal slot into a back-swiveled rest position, wherein the means for blocking the first catch are disposed within the slide and are actuated from the outside of the slide.

12. The fence ruler according to claim 11, wherein the means for blocking comprise an adjustment rod having a longitudinal axis and a free end.

13. The fence ruler according to claim 12, wherein the longitudinal axis of the adjustment rod is in offset position with respect to the swivel axis of the catch.

14. The fence ruler according to claim 13, wherein the adjustment rod has a free end, and wherein the free end attains its rest position by engaging a bow-shaped skirt edge of the first catch.

15. The fence ruler according to claim 12, wherein the adjustment rod comprises a resilient material and further includes an external thread for axially engaging the adjustable rod into a threaded bore hole in the bearing body of the slide.

16. The fence ruler according to claim 15, wherein the adjustment rod extends to the outside of the slide through a longitudinal bore in the thrust body of the slide.

17. The fence ruler according to claim 16, wherein the adjustment rod comprises a first portion and a second portion, wherein the second portion is threaded and is connected to the first portion within a recess situated longitudinally within the thrust body with a screw bushing, wherein the second portion extends adjustment rod to the outside of the slide, and wherein a turn actuating elements is mounted to the end of the adjustment rod protruding beyond the thrust body.

18. The fence ruler according to claim 17, wherein the turn actuating element and the screw bushing operate as end stops restricting the longitudinal translation of the adjustment rod.

19. The fence ruler according to claim 6, wherein the first catch comprises a brake friction element protruding from opposite faces of the first catch and operating by frictional contact within the longitudinal slot when the slide is moved in a direction opposite to the direction of advancement of the work piece, and wherein the brake friction element maintains the first catch in its rest position swiveled back within the longitudinal slot.

20. The fence ruler according to claim 19, wherein the thrust body is positioned over swivable supporting rollers within the hollow space.

21. The fence ruler according to claim 20, wherein each of the supporting rollers rotates in the thrust body about an axis oblique to the saw table, the supporting rollers extending out of the edges of the thrust body.

22. The fence ruler according to claim 6, wherein the rod is connected to one or both of the bearing body and the thrust body with a threaded connection.

23. The fence ruler according to claim 6, wherein the slider comprises an external block bearing the handle and a protruding flange extending through the through slot into the hollow space, where it is affixed to the thrust body.

24. The fence ruler according to claim 23, wherein one side of the block of the slider is supported by adjustable guiding elements contacting the profiled hollow body.

25. The fence ruler according to claim 23, further comprising a slide roller protruding over the flange and rolling off an interior wall of the hollow space, the slide roller being disposed in a recess of the flange.

26. The fence ruler according to claim 1, wherein the profiled hollow body is engaged with the saw table by at least one of two longitudinal cavities, wherein each of the longitudinal cavities has a T-shaped profile, and is formed into a side of the profiled hollow body, and wherein one of the longitudinal cavities engages a clamping body connected to the machine table.

27. The fence ruler according to claim 26, wherein the clamping body comprises an adapter, having a clamping strip, and a clamping enclosure, wherein the adapter has, on a side opposite to the clamping strip, an adjustable receptacle slot for receiving the clamping enclosure, and wherein the clamping strip is configured for translating along the clamping enclosure.

28. The fence ruler according to claim 27, wherein the adjustable receptacle slot is formed by two opposing bars with L-shaped cross-sections, the distance between the two opposing bars being adjustable.

29. The fence ruler according to claim 27, further comprising a clamping connection element mountable on the adapter, the clamping connection element comprising a plate insertable between the clamping enclosure and the adapter, a plurality of walls extending from the plate and abutting the profiled hollow body after clamping the clamping body.

30. The fence ruler according to claim 29, further comprising pins extending from the adapter to engage in matching recesses in the clamping connection element.

* * * * *